Oct. 3, 1961 R. E. DENNEY 3,002,331
ROTARY POWER MOWER
Filed July 20, 1959
Fig.1
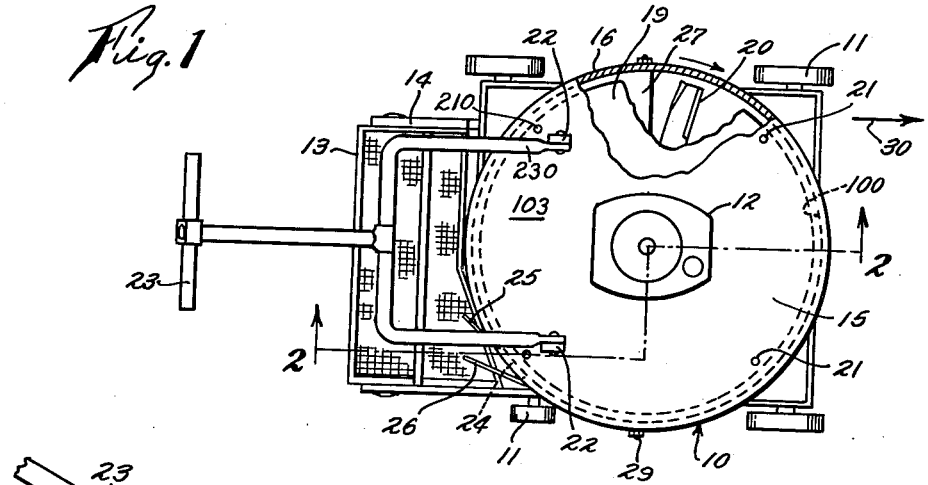
Fig.2
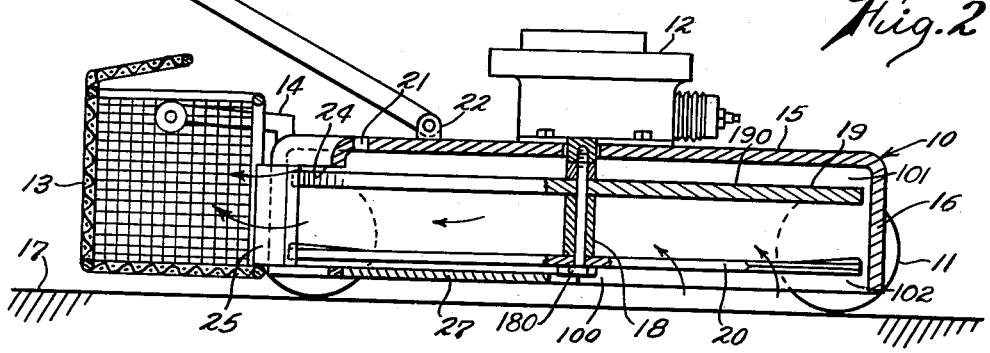
Fig.3
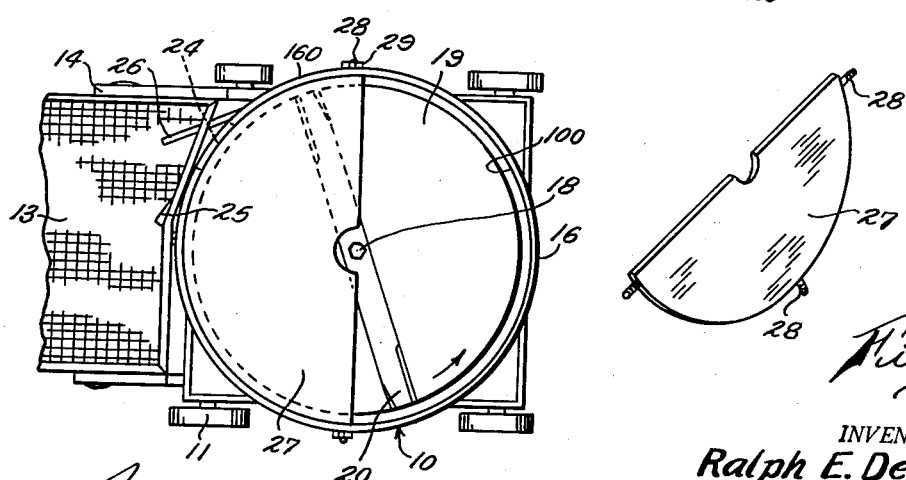
Fig.4
INVENTOR.
Ralph E. Denney
BY
Murray, Sackhoff & Murray
ATT'YS

United States Patent Office 3,002,331
Patented Oct. 3, 1961

3,002,331
ROTARY POWER MOWER
Ralph E. Denney, Cincinnati, Ohio, assignor of two-fifths to Philip Ganson, Cincinnati, Ohio
Filed July 20, 1959, Ser. No. 828,153
3 Claims. (Cl. 56—25.4)

The present invention relates to power driven rotary grass mowers and is particularly directed to a guard plate for this type of mower which also provides improved air channeling means for entraining and then discharging grass clippings and other vegetation upon the lawn or into a suitable porous container mounted on the mower as the mower is continuously moved across the grass to be cut.

It is an object of this invention to provide a simple, but effective guard for shielding the rear portion of a power driven, rotary grass mower, especially of the walking type, said guard also securing improved air flow conditions within the mower housing for directing clippings and other vegetation from the grass cutting, forward part of the housing into a container located rearwardly of the mower housing.

Another object of the invention is to provide an imperforate safety guard for a rotary power mower that creates improved pneumatic grass clipping conveying means within the mower housing whilst serving as a skid pan to protect the rotating blade when the mower is pushed over uneven ground and which will also prevent insertion of the operators foot into the path of said blade.

Other objects will appear from the following description and claims taken in conjunction with the accompanying drawings, wherein:

FIG. 1 is a fragmental, top plan view of my mower, wherein parts are broken away and other parts shown in section.

FIG. 2 is an enlarged section taken on line 2—2 of FIG. 1.

FIG. 3 is a fragmental, bottom plan view of the mower as illustrated in FIG. 1.

FIG. 4 is a perspective view of the guard plate for the rotary mower shown in FIGS. 1–3.

This invention is particularly adaptable to the type of rotary power lawn mower disclosed in United States Patent to Ralph E. Denney, No. 2,796,714 and granted on June 25, 1957. Since the invention herein is not concerned with the details of the housing 10, the wheels 11, the source of power 12, the grass catcher 13, or the latter's mounting means 14 on the housing, these parts have been illustrated without detail. The housing 10 is preferably circular and comprises a top wall 15 and a skirt 16 joined to the periphery of the top wall and depending therefrom to provide a downwardly facing opening 100 in said housing 10 that is supported by the wheels 11 in closely spaced relation above the lawn 17 to be cut. A vertical, power driven shaft 18 is mounted on and depends into the center of the housing 10, said shaft being of a bolted, sectionalized construction to fixedly but detachably mount thereon and within the housing, in vertically spaced relationship, an air disk 19 and a cutter blade 20. The air disk is mounted on the upper end of the shaft 18 adjacent the top wall 15 for rotation in the upper portion 101 of the housing whilst the cutter blade is vertically spaced from the air disk and is mounted on the lower end 180 of the shaft 18 for rotation in the lower portion 102 of the housing. A circular row 210 of angularly spaced apart air inlet holes 21 is formed in the top wall 15 of the housing to admit air into the upper portion 101 of the housing between the top wall 15 and the air disk 19 to relieve vacuum conditions therein created by the centrifugal action of the upper face 190 of the disk during rotation of said disk.

Laterally spaced apart brackets 22 are mounted on the rear portion 103 of the housing top wall 15 to provide a pivotal connection between the lower ends 230 of a rearwardly extending handle bar 23 and the housing for pushing or pulling the mower over the lawn 17. With respect to the normal forward movement of the mower by pushing it over the area to be cut by the handle bar 23, a rectangular opening 24 is formed through the skirt 16 and is positioned within that rear half portion 160 of the skirt which is located behind the position of the vertical power shaft 18. As best indicated in FIGS. 1 and 3, the opening 24 is preferably located to one side of the longitudinal center of the mower and is thereby adapted to discharge clippings from the housing at an angle to the direction and motion of the mower. A pair of outwardly flaring baffles 25 and 26 are fixed to the skirt 16 on opposite sides of the opening 24 to assist in directing grass clippings into a porous grass catcher 13 secured to and positioned behind the rear part of the housing by suitable mounting means 14. It will be noted with reference to FIG. 2 that the opening 24 in the skirt extends somewhat above the air disk 19 and somewhat below the cutter blade 20 and has a substantially greater vertical extent than the vertical spacing between said air disk and said cutter blade.

An imperforate guard plate 27 is positioned on the housing and extends across and closes the rear portion of the downwardly facing opening 100 in the housing skirt 16. Any suitable means may be employed to mount the plate on the skirt 16 of the housing, one means being illustrated as several threaded studs 28 extending radially from the periphery of the guard plate 27 and projecting through suitable holes in the lower edge portion of the skirt, nuts 29 co-operating with the threaded studs to secure the plate in position on the housing.

In the operation of the mower the source of power 12 will rotate the shaft 18 around its vertical axis which will in turn rotate the disk 19 and the cutter blade 20 in unison within the housing in the rotary direction indicated by the arrows in FIGS. 1 and 3. The mower is then pushed by means of the handle bar 23 in the direction of the arrow 30 (FIG. 1) over the area to be cut and the combined centrifugal action of both the disk 19 and the blade 20 will cause grass clippings to move from the forward part of the housing rearwardly into the funnel-shaped chamber that is formed by the rear portions of the top wall 15, the skirt 16 and the entire guard plate 27. The clippings will thus be funneled and directed to and through the discharge opening 24 in the skirt and ejected under considerable force into the catcher 13. It is to be observed that the funnel-shaped chamber has a forwardly facing opening extending laterally across the center of the housing which communicates with the interior of the forward part of the housing and that this forward part has a downwardly facing opening bounded by the forward edge of the guard and the forward part of the skirt. It will also be understood that as the mower is advanced over the area to be cut all the standing grass will be presented to this forward downwardly facing opening and will be cut by the blade and upon being cut will be moved by the pneumatic action of the disk and the blade into the said funnel-shaped chamber and thence through the discharge opening 24 into the catcher 13.

Improved air flow conditions and grass clipping conveying functions are attained within the mower in that the centrifugal movement of air set up by the underside of the disk 19 and the blade 20 is directed through the funnel-shaped chamber and forcibly ejected through the discharge opening 24, the physical contact of said clippings with the underside of the disk also aiding in the bodily movement of the clippings into said discharge opening. The discharge opening also extends above the top of the disk 19 whereby a current of pressure air, set up within the upper portion of the housing between the top wall 15 and the disk 19, will be forcibly discharged through the top of the opening to keep grass clippings, discharged through the lower part of said opening, from moving above the level of the opening top and thus preclude discharge of clippings through the open top of the grass catcher.

It is, of course, contemplated that the mower could be used without the catcher and the clippings would then be discharged through the opening onto the cut area immediately behind the mower. Other changes in the construction and arrangement of the various parts may be made without departing from the scope of this invention as expressed in the appended claims.

What is claimed is:

1. In a mower of the rotary blade type, an inverted dish-shaped housing having an open bottom, said housing having a lateral discharge opening formed therethrough, a power shaft extending through the top of said housing and having a cutter blade thereon within said housing and an air disk on said shaft above said cutter blade, an imperforate disk-shaped plate below said cutter blade and engaging the lower part of said housing, said blade covering substantially the rear half of the bottom of said housing to form a cutter blade guard and a mulching chamber for said mower.

2. The same structure as recited in claim 1 hereof and in which the lateral discharge opening is located at the rear of the housing.

3. The same structure as recited in claim 1 hereof and in which the discharge opening communicates with a perforate catcher mounted on the exterior rear portion of the housing.

References Cited in the file of this patent

UNITED STATES PATENTS

| | | |
|---|---|---|
| 2,641,100 | Sylvester | June 9, 1953 |
| 2,701,942 | Caldwell et al. | Feb. 15, 1955 |
| 2,734,327 | Whitney | Feb. 14, 1956 |
| 2,796,714 | Denney | June 25, 1957 |
| 2,806,339 | Whitney | Sept. 17, 1957 |
| 2,906,082 | Mathis | Sept. 29, 1959 |
| 2,914,902 | Beymer | Dec. 1, 1959 |

FOREIGN PATENTS

| | | |
|---|---|---|
| 1,163,635 | France | Apr. 28, 1958 |